United States Patent [19]

Braun

[11] 4,154,923

[45] May 15, 1979

[54] DEWATERING POLYVINYLALCOHOL STABILIZED POLYMER SLURRIES

[75] Inventor: Willy Braun, East Brighton, Australia

[73] Assignee: Dulux Australia Limited, Melbourne, Australia

[21] Appl. No.: 922,050

[22] Filed: Jul. 5, 1978

[30] Foreign Application Priority Data

Jul. 19, 1977 [AU] Australia .............................. PD0903

[51] Int. Cl.$^2$ ............................ C08F 6/22; C08F 6/24
[52] U.S. Cl. .................................. 528/485; 528/486; 528/487; 528/488; 528/411; 528/412

[58] Field of Search ............... 260/DIG. 48; 528/485, 528/486, 487, 488, 491, 492

[56] References Cited

U.S. PATENT DOCUMENTS 2,835,643   5/1958   Bauer et al. ........................... 528/487

*Primary Examiner*—Stanford M. Levin
*Attorney, Agent, or Firm*—Cushman, Darby & Cushman

[57] ABSTRACT

Dewatering aqueous polymer slurries containing polyvinylalcohol stabilizer by forming an insoluble organic destabilizer in situ from a soluble parent compound comprising ionizable groups. The slurry may then be filtered at 50° C. or higher to yield a soft cake of beads essentially free of stabilizer.

9 Claims, No Drawings

DEWATERING POLYVINYLALCOHOL STABILIZED POLYMER SLURRIES

This invention relates to a process of recovering polymeric beads from an aqueous slurry thereof, as a soft, friable cake. In particular, it is concerned with the recovery of an essentially stabilizer-free cake from a slurry containing a poly(vinyl alcohol) dispersion stabilizer.

In recent years, a number of proposals have been made to use polymeric beads, for example spheroidal granules of synthetic polymer with a diameter of from 1-50 $\mu$m, as matting and opacifying agents in products such as paint, plastics and paper.

One particularly useful class of bead is that made from unsaturated polyester resin, which is cured by cross-linking it with styrene or a similar unsaturated monomer. The beads may be solid or vesiculated and typical examples are described in, for example, Australian patent specifications Nos. 434,658 and 439,432.

Beads of this type are commonly made by a process which yields a slurry of polymer beads in water containing a poly(vinyl alcohol) dispersion stabilizer and are described in, for example, Australian patent specification No. 445,277. The slurries typically have a bead content of the order of 30% by weight.

When such polymer beads are to be used in an aqueous product, for example in a latex paint, they can often be blended directly with the other components as an aqueous slurry, without any intermediate de-watering process. However, if the end product is to be essentially anhydrous the requirement to first de-water beads which have been made as an aqueous slurry, can raise serious economic and technical problems.

For example, the energy required to dry a 30% by weight slurry of beads in water by direct evaporation in an acceptable time, can add an intolerable cost penalty to the beads. Furthermore, we have found that heating a bead slurry to evaporate the water can cause hard aggregates of beads to form. These aggregates may be difficult, if not impossible, to break up satisfactorily in subsequent dispersion processes. This problem appears to result from the presence in the slurry of the poly(vinyl alcohol) dispersion stabilizer.

Concentrating the slurry by settling or centrifuging to remove the bulk of the water does not appear to be a suitable alternative to evaporative drying, as the beads often have a density too close to that of water for effective separation. Attempts to filter the beads from the slurry have also been disappointing. The beads, being spheroidal in shape, pack quickly to a dense cake which in the presence of poly(vinyl alcohol) blinds the filter bed and reduces throughput rates to an intolerably low level. Even when some cake is produced by these methods, it has been our experience that subsequent drying of that cake, for example by exposing it to a stream of hot air, still results in the formation of hard, unacceptable aggregates.

We have now found that if a slurry of polymer beads in water containing a poly(vinyl alcohol) dispersion stabilizer is first destabilized in the manner hereinunder described, the slurry can then be de-watered by conventional means to a soft, stabilizer-free cake. The cake can subsequently be dried, if desired, to a friable, re-dispersible powder.

The destabilizing process we now disclose involves precipitating in the slurry a selected destabilizer, which causes the polymer beads to flocculate and also enables the poly(vinyl alcohol) stabilizer to be flushed from them with the effluent liquid, when de-watering is carried out. The slurry can then be de-watered by conventional physical means, for example by filtration or by centrifuging, to yield a soft, essentially stabilizer-free cake of polymer beads together with some residual water. If required, this cake can then be dried, for example by circulating heated air at a temperature lower than the softening point of the polymer beads, over and through the cake.

This dual action of our selected destabilizer is somewhat surprising, in view of the fact that some other well-known materials, notably certain polymeric flocculants used commercially in water treatment processes, will flocculate such polymer bead slurries that will not destabilise them to the point where the slurries can readily be de-watered. It appears that flocculation of the beads alone is not sufficient to overcome the dewatering problem.

It is implicit in our stipulation that the destabilizer shall be precipitated in the slurry, that the destabilizer itself must be insoluble in the aqueous phase thereof and that it can be produced in situ from a soluble parent compound.

The particular substances we have found to be effective destabilizers are organic materials which may, but need not be, polymeric. They must, however, have a molecular weight of at least 200. In their soluble form, the destabilizers comprise solubilizing ionizable groups, the elimination of which renders the molecule as a whole insoluble in the aqueous phase of the slurry.

The destabilizer may be, for example, a carboxylic acid. Suitable carboxylic acids are, for example, stearic, 12-hydroxy stearic, abietic, oleic and dimerised fatty acids, styrene/maleic anhydride copolymer, di-isobutylene/maleic anhydride copolymer and poly(acrylic acid). We have found that for the best results, the carboxylic acid should preferably have an acid value of at least 100 mgm KOH per gm. Other satisfactory destabilizers are the heavy metal salts of such fatty acids.

The destabilizer may comprise an acid grouping other than a carboxyl group. For example, the destabilizer may comprise a moiety derived from sulphuric or phosphoric acids. That is, the destabilizer may be, for example, a sulphonated polystyrene or sulphated castor oil. Another useful class of destabilizer is provided by, for example, sulphonating the maleic anhydride half ester of a styrene-allyl alcohol copolymer, to give a polymeric product which is alkali-soluble but becomes water-insoluble when acidified. A somewhat similar class of destabilizer may be prepared by reacting a polymer or copolymer of glycidyl methacrylate with sulphuric or phosphoric acids.

Alternatively, the insoluble destabilizer may be an amine. As with the acidic destabilizers, the amine must be per se insoluble in the aqueous phase of the bead slurry and provided this requirement is met, the amine may be a mono-amine or a polyamine.

Thus the amine may, for example, be a primary amine of the structure R—NH$_2$ in which R is an alkyl group with a carbon chain length of 12-18 atoms. The carbon chain may be a fatty acid moiety derived from, for example, lauric, myristic, stearic and oleic acids and mixtures of such acids as they are derived from natural products. Suitable destabilizers of this type are tallow, coconut and soya amines.

The amine destabilizer may be a secondary amine of the structure R—NH—R where R is an alkyl group of the type discussed hereinabove. Alternatively, the molecule may comprise both primary and secondary amine groups.

The amine may also be a diamine with the general structure R—NH—R$_1$—N H$_2$ where R and R$_1$ are alkyl groups. Suitable compounds of this type are, for example, oleyl propylene and lauryl propylene diamine. Alternatively, it may be a fatty acid salt, for example a mono- or di-oleyl salt, of such a diamine. We have found the mono-fatty acid salt of e.g. oleyl propylene diamine to be a particularly useful destabilizer for some bead slurries.

The amine may be a zwitterion, for example it can be a compound of the structure

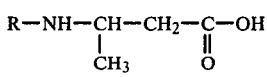

in which R is an alkyl group, e.g. a lauryl chain.

The form in which the destabilizer is introduced into the slurry as a soluble derivative will naturally depend on the composition of the destabilizer itself. For example, an acid destabilizer may be converted to its water-soluble sodium, or potassium salt by reaction with the corresponding base and re-precipitated when required by acidifying the slurry. Alternatively, a suitable soluble acid may be reacted with a heavy metal salt, e.g. barium chloride and calcium nitrate, to precipitate a heavy metal salt of the acid.

A convenient way of forming an amine destabilizer in the slurry, is to start with a corresponding soluble alkyl acid salt and to form the insoluble destabilizer from this by an exchange reaction with e.g. a fatty acid soap of an alkali metal. For example, the soluble oleyl propylene diamine diacetate will react with sodium stearate to precipitate the corresponding insoluble stearyl destabilizer.

When the amine is a zwitterion, it may as with the acid destabilizers described hereinabove, be solubilized by converting it to an alkali metal salt by the reaction of, for example sodium hydroxide, with the carboxyl group. The destabilizer is then formed in situ in a slurry in which the salt is dissolved by acidifying the aqueous phase thereof.

In selecting a destabilizing agent it is, of course, necessary to select a material which will not react unfavourably with any component of the slurry to be treated. For example, we have observed that if the slurry contains traces of benzoic acid, e.g. as residues of benzoyl peroxide polymerization initiator formed during bead manufacture, these can react with aliphatic amines, which would therefore be an unsatisfactory destabilizing agent to use with that particular slurry.

The quantity of destabilizing material to be used depends on factors such as, for example, the concentration of poly(vinyl alcohol) in the slurry and the chemical nature and particle size of the polymer beads. It is therefore usually desirable to determine experimentally for any particular combination of slurry and destabilizing material what the optimum concentration is. As a general guide, however, we have found that a concentration 1-3% by weight based on the disperse phase content of the slurry is usually sufficient. At lower concentrations, the rate of de-watering is inhibited by incomplete bead flocculation and usually nothing is to be gained by using much higher concentrations.

If the destabilized slurry is not already at that temperature, it must be heated to at least 50° C. to complete the process, before it is concentrated by filtration or centrifuging. The final cake can be readily washed with water to remove remaining traces of poly(vinyl alcohol) stabilizer. The solids content of the final cake is typically 60-70% by weight, not allowing for any water which may be present as an internal occlusion in the disperse particles.

Provided, as mentioned hereinabove, due regard is paid to the softening point of the polymer beads, the soft cake from the dewatering process can be dried by conventional means.

The invention is illustrated by the following examples in which all parts are given by weight:

EXAMPLE 1

Use of a polycarboxylic acid destabilizer in the filtration of a slurry of polyester beads.

The slurry of polyester beads used in this example had the following characteristics. The beads consisted of an unsaturated polyester resin cured by reacting it with 40% by weight of styrene monomer. The slurry contained 38.9% by weight of beads with a maximum diameter of 50 μm and a mean diameter of 20-25 μm dispersed in an aqueous phase comprising 2.4% of poly(vinyl alcohol) based on the weight of beads present. The grade of poly(vinyl alcohol) used was an 88%. hydrolyzed poly(vinyl acetate) which had a viscosity of 40 cps at 20° C. as a 4% by weight solution in water.

To 2604 parts of slurry (containing 1000 parts of beads) was added 700 parts of water and the pH adjusted to 7.5-8.5 with ammonia solution.

A solution of a soluble ionizable salt of a polycarboxylic acid was prepared by dissolving in water made alkaline with ammonia, 33% by weight of a copolymer of styrene and maleic anhydride in the approximate molar ratios of 52:48. The molecular weight of the copolymer was approximately 2500.

Thirty parts of the ionizable salt solution was diluted to 500 parts with water and added with stirring to the bead slurry. The pH was adjusted to 4.5 with a 10% by weight solution in water of acetic acid to liberate the polycarboxylic acid destabilizer and the batch temperature raised to 70° C. A sample viewed by transmission microscope at ×200 magnifications showed the bead slurry to be highly flocculated.

The batch filtered readily through a conventional vaccum filter. The filter cake was water-washed to give a clean, friable product.

The initial filtrate was noticeably viscous and gelled on addition of sodium borate, in the manner characteristic of a poly(vinyl alcohol) solution.

A sample of the untreated slurry showed no flocculation under the microscope. Attempts to filter it through the same vacuum filter used for the destabilized slurry were unsuccessful, even when the sample was heated to 70° C. and diluted with additional water.

Blinding of the filter medium by the bead cake rapidly reduced the rate of filtration to an impractical trickle.

EXAMPLE 2

Use of a fatty acid destabilizer.

The general process of Example 1 was repeated, except for the substitution of 600 parts of a 5% by weight solution of sodium stearate in hot water for the 30 parts of ionizable salt solution of that example.

The destabilized slurry once more filtered readily and poly(vinyl alcohol) was detected in the filtrate.

Similar results were obtained using sodium dodecyl benzene sulphonate in place of the sodium stearate and acidifying to pH2 with hydrochloric acid instead of acetic acid. The slurry was stable at a pH of 2 in the absence of the sodium dodecyl benzene sulphonate.

EXAMPLE 3

Use of a heavy metal salt destabilizer.

A sample of 2604 parts of polyester beads slurry adjusted to a pH of 8.9, was prepared as described in Example 1.

An addition of 600 parts of a 5% by weight solution of sodium stearate in hot water was then made to the slurry, with constant stirring, followed by an addition of 110 parts of a 5% by weight solution in water of calcium chloride. In the presence of the heavy metal salt destabilizer so-formed, the beads were observed to flocculate.

The batch was then heated to 70° C. and filtered as described in Example 1. Good filtration rates were again obtained. The washed filter cake was soft and friable. Poly(vinyl alcohol) was again observed in the filtrate.

EXAMPLE 4

Use of an aliphatic primary amine destabilizer.

A sample of 2604 parts of polyester beads slurry adjusted to a pH of 7.5-8.5 was prepared as described in Example 1.

An addition of 600 parts of a 5% by weight solution in water of the acetate salt of a primary amine derived from coconut fatty acids was stirred into the adjusted slurry. The pH was then adjusted to 9.0 with 5% by weight aqueous sodium hydroxide solution to precipitate the aliphatic primary amine destabilizer. Microscope examination of the slurry confirmed the flocculated state of the polyester beads.

Then heated to 70° C. the batch filtered readily with similar desirable results to those recorded for the destabilized in Example 1.

EXAMPLE 5

Use of the fatty acid salt of a diamine as a destabilizer. The molecule comprises both primary and secondary amine groups.

A sample of 2604 parts of polyester beads slurry adjusted to a pH of 7.5-8.5 was prepared as described in Example 1.

An addition of 360 parts of a 5% by weight solution in water of a tallow trimethylene diamine diacetate salt was stirred into the adjusted slurry, followed by 200 parts of a 5% by weight solution in hot water of sodium stearate and the batch heated to 70° C.

In the presence of the destabilizer which formed in situ, the polyester beads were highly flocculated.

Similar favourable results to that of Example 1 were obtained when the slurry was filtered as described in that example.

When this example was repeated using successively coconut, soya and olive trimethylene diamines as the basis of fatty acid salt destabilizers, satisfactory filtration rates and film cakes were obtained.

The filter cakes were allowed to dry in a current of warm air at 70° C. to yield free-flowing powders essentially free of any agglomerates of beads.

EXAMPLE 6

Effect of temperature on the filtration rate of a destabilized bead slurry containing poly(vinyl alcohol).

The beads used in this example were similar to those of Example 1 but the beads content was 37% by weight of the slurry.

To 1350 parts of bead slurry (500 parts of beads) was added 350 parts of water and the pH adjusted with aqueous ammonia solution to 8–9.

Three hundred parts of a 5% solution by weight of sodium stearate in water was then added with stirring to the batch, followed by an adjustment to a pH of 4–5 with 10% by weight acetic acid solution in water. The beads flocculated.

The batch was then subjected to filtering trials by the general method of Example 1, but using a series of processing temperatures which did not exceed that at which the poly(vinyl alcohol) precipitates from aqueous solution. The time taken to filter equal parts of slurry at the different temperatures and the appearance of the filtrate is shown in the following table.

| Filtration Temp °C. | Time Taken | | Condition of Filtrate |
|---|---|---|---|
| 30 | 7 hrs | | Milky |
| 50 | 1 hr. 20 | min | Slt. Cloud |
| 70 | 11 | min | Turbid. |
| 80 | 8 | min | Clear |

It appears from the results that complete destabilization is not being achieved at temperatures below 50° C., at which temperature and above there is a substantial increase in filter throughput rate.

Although a slight carry-over of very fine beads was observed at 50° C., becoming less noticeable as the temperature rose further, we assessed the efficiency of destabilization and rate of filtration to be at an acceptable practical level provided that minimum temperature was maintained.

A similar pattern was observed when the above experiments were repeated using the stearate salt of a tallow trimethylene diamine as the destabilizer.

EXAMPLE 7

Comparative examples using conventional coagulants as aids to filtration.

An attempt was made to utilize conventional commercially available high molecular weight polyelectrolyte coagulants as destabilizers for the slurry of Example 1, using the method of filtration described in that example.

The materials selected were products sold under the Trade Mark "Alfloc" as flocculants for use in industrial water clarification processes. The particular grades used had the following characteristics:

| Grade | Charge in soln. | pH of 0.1% soln. |
|---|---|---|
| 6701 | non-ionic | approx. 7.0 |
| 6751 | anionic | approx. 7.8 |
| 6361 | cationic | 5.0-5.5 |

Each flocculant was made up into an aqueous solution and added to a sample of slurry as used in Example 1, at the concentration recommended by the manufacturer.

In each case, flocculation of the beads was observed under the microscope, but filtration rates were extremely slow and the filtrate was quite cloudy. The appearance of the filter cake was consistent with it having retained a substantial proportion of the poly(vinyl alcohol) slurry stabilizer.

These results when contrasted with those obtained using our destabilizer in Example 1, show that the ability to flocculate the bead slurry is not in itself sufficient to completely destabilize it and to release the poly(vinyl alcohol) to the filtrate.

EXAMPLE 8

The use of destabilizer comprising sulphuric acid moieties.

A slurry of 40% by weight 35 μm mean diameter cross-linked polyester beads in an aqueous phase comprising 2.5% by weight of poly(vinyl alcohol) stabilizer was destabilized in the following manner.

To 2500 parts of slurry containing 1000 parts of beads was added with stirring, 700 parts of water. The pH was then adjusted with aqueous sodium hydroxide solution to 7 and the temperature raised to 70° C. An addition was then made of 60 parts of a 50% by wt. solution in water of the sodium salt of a sulphated castor oil known commercially as Turkey Red Oil.

Acetic acid was then added, with stirring, until the pH reached 3.2. A sample of slurry examined by microscope showed that the beads, previously well dispersed, had become highly flocculated. The destabilized slurry filtered readily on a vacuum filter. The filtrate contained poly(vinyl alcohol)

The above procedure was repeated with equally successful results using a slurry containing 32% by wt of polyester beads with a mean diameter of 10 μm. The slurry could not be filtered at an acceptable rate before destabilization according to this invention.

In a similar manner, a slurry of 35% by wt. polystyrene beads of mean diameter 15 μm was successfully destabilized and filtered.

We claim:

1. A process of dewatering an aqueous slurry of polymer beads which slurry contains a poly(vinyl alcohol) dispersion stabilizer, characterized in that:
   (1) there is first precipitated in the slurry an insoluble organic destabilizer having a molecular weight of at least 200 from a soluble parent compound comprising solubilizing ionizable groups, in sufficient quantity to flocculate and promote dewatering of the slurry; and
   (2) dewatering the slurry so-treated by physically separating therefrom water, at a temperature of at least 50° C., to form a soft cake of polymer beads essentially free of poly(vinyl alcohol) dispersion stabilizer.

2. A process wherein a soft cake of polymer beads prepared according to claim 1 is dried to a friable, redispersible powder.

3. A process according to claim 1 characterized in that the insoluble destabilizer is a carboxylic acid or heavy metal salt thereof.

4. A process according to claim 3 characterized in that the carboxylic acid has an acid value of at least 100 mg KOH per gm.

5. A process according to claim 1 characterized in that the insoluble destabilizer comprises an acid grouping other than a carboxyl group.

6. A process according to claim 5 characterized in that the acid group is a moiety derived from sulphuric or phosphoric acids.

7. A process according to claim 1 characterized in that the insoluble destabilizer is an amine.

8. A process according to claim 7 characterized in that the amine is selected from a primary amine of the structure $R-NH_2$; a diamine of the structure $R-NH-R$ and a secondary amine of the structure $R-NH-R_1-NH_2$, wherein R and $R_1$ are alkyl groups and R has a carbon chain length of 12–18 atoms.

9. A process according to claim 7 characterized in that the amine is a zwitterion.

* * * * *